(12) United States Patent
Yun et al.

(10) Patent No.: US 7,373,084 B2
(45) Date of Patent: May 13, 2008

(54) OPTICAL NETWORK TERMINATION DEVICE FOR USE IN PASSIVE OPTICAL NETWORK BASED ON WDM/SCM SCHEME

(75) Inventors: Hyun Ho Yun, Daejeon (KR); Tae Yeon Kim, Daejeon (KR); Jeong Ju Yoo, Daejeon (KR); Byoung Whi Kim, Daejeon (KR)

(73) Assignee: Electronics and Telecommunications Reasearch Institute, Daejeon (KR)

( * ) Notice: Subject to any disclaimer, the term of this patent is extended or adjusted under 35 U.S.C. 154(b) by 628 days.

(21) Appl. No.: 10/913,884

(22) Filed: Aug. 5, 2004

(65) Prior Publication Data

US 2005/0135808 A1 Jun. 23, 2005

(30) Foreign Application Priority Data

Dec. 18, 2003 (KR) .................. 10-2003-0093463

(51) Int. Cl.
*H04J 14/00* (2006.01)
(52) U.S. Cl. .......................... 398/72; 398/66; 398/67; 398/68; 398/69; 398/70; 398/71; 398/75; 398/76; 398/79; 398/98; 398/99; 398/100; 398/102; 398/135; 398/182; 398/183; 398/186; 398/187; 398/202; 370/445; 370/463; 370/468; 370/473; 370/466; 370/535; 370/536; 370/390; 370/392; 370/394; 370/351
(58) Field of Classification Search .................. 398/70, 398/71, 72, 66, 67, 68, 76, 79, 98, 100, 99, 398/69, 75, 58, 59, 135, 102, 182, 183, 187, 398/186, 202, 141; 370/445, 463, 473, 465, 370/466, 468, 389, 535, 536, 351, 401, 390, 370/392, 394
See application file for complete search history.

(56) References Cited

U.S. PATENT DOCUMENTS

| | | | | |
|---|---|---|---|---|
| 6,081,523 A | * | 6/2000 | Merchant et al. | ........... 370/389 |
| 6,094,439 A | * | 7/2000 | Krishna et al. | ............. 370/445 |
| 6,512,742 B1 | | 1/2003 | Alexander, Jr. et al. | |

FOREIGN PATENT DOCUMENTS

| KR | 1994-7004907 | 12/1994 |
|---|---|---|
| KR | 1020030033407 | 5/2003 |

OTHER PUBLICATIONS

"Dynamic Sub-carrier Multiplexed channel allocation and efficient frame distribution scheme in optical access networks" Kim, Namuk, et al.; *The Institue of Electronics Engineers of Korea, '03 Communication Society*, A Collection of thesis an Autumn Science Meeting; pp. 113-116; Nov. 2003, abstract.

* cited by examiner

*Primary Examiner*—Hanh Phan
(74) *Attorney, Agent, or Firm*—Blakely, Sokoloff, Taylor & Zafman LLP

(57) ABSTRACT

A termination device for use in a WDM-SCM PON system can effectively support a multi-channel integration function of a WDM/SCM PON system. The termination device contained in a termination end of a WDM/SCM (Wavelength Division Multiplexing/Sub-Carrier Multiplexing) PON (Passive Optical Network) to connect the PON with either a subscriber or an Ethernet service network includes: an Ethernet interface module connected to the Ethernet service network or the subscriber to perform an Ethernet interface function; a WDM/SCM physical layer module physically connected to the WDM/SCM PON to transmit/receive optical signals to/from the WDM/SCM PON; and a MAC (Media Access Control)-bridge module for performing a multiplexing/demultiplexing operation based on a MAC address upon receipt of transmission/reception frames, and reconstructing preambles of the frames while being classified according to channels so that individual Ethernet frames are matching-processed while being classified according to SCM channels of the WDM/SCM physical layer module.

9 Claims, 7 Drawing Sheets

OPTICAL NETWORK TERMINATION DEVICE FOR USE IN PASSIVE OPTICAL NETWORK BASED ON WDM/SCM SCHEME

BACKGROUND OF THE INVENTION

1. Field of the Invention

The present invention relates to a PON (Passive Optical Network) based on a WDM (Wavelength Division Multiplexing)/SCM (Sub-Carrier Multiplexing) scheme, and more particularly to a termination device for use in a PON system based on a WDM/SCM scheme, which can effectively use a WDM/SCM-based multi-link (i.e., multiplexing link) simultaneously with being compatible with a conventional Ethernet system, and can guarantee a transmission sequence between a transmission node and a reception node.

2. Description of the Related Art

There has recently been developed a PON (Passive Optical Network) system for satisfying a user-requested high frequency band for use in a digital communication service. The PON system is a subscriber distribution network for connecting a communication connection path requested between the Ethernet network and a subscriber to an optical wavelength provider using a passive optical element, and includes a variety of terminal devices for connecting the passive optical element to either a subscriber or an Ethernet network. A terminal device connected to the subscriber is called an ONT (Optical Network Terminal), and the other terminal device connected to the Ethernet network is called an OLT (Optical Line Terminal).

Basically, the PON system combines a plurality of ONTs with each other using an optical splitter (also called an optical distributor) so that a link ranging from the optical splitter to one OLT is shared with a plurality of subscribers. Therefore, there must be newly developed a method for multiplexing the link shared between the optical splitter and the OLT in an upstream service for transmitting data in the range from the subscribers to the Ethernet network.

There are a variety of such multiplexing methods, for example, a TDM (Time-Division Multiplexing) scheme and an active switching scheme (also called a Home-Run scheme). In the case of downstream transmission, the TDM scheme controls the ONT to perform photoelectric conversion so that it filters data using either an address or an additional ID (e.g., an EPON's LLID) of packets. In the case of upstream transmission, the TDM scheme controls each ONT to transmit an upstream packet over a timeslot having a predetermined time interval at a fixed time. A PON system using the aforementioned TDM scheme is called a TDM-PON system.

The active switching scheme (i.e., the Home-Run scheme) controls an active node ranging from an OLT to an ONT to classify physical links using a point-to-point access scheme, and uses the classified physical links. In this case, the active node must recognize a corresponding port using the photoelectric conversion process, and must perform electric-to-optical conversion such that it can perform an optical transmission operation in the range from a source to either the OLT or the ONT. This network using the aforementioned active switching scheme is called an active network.

The TDM-PON system has advantages in a variety of areas, for example, installation, extensibility, and economic efficiency of optical cables. There is no need for the TDM-PON system to require additional control operations in the case of downstream transmission, but it can perform a high-speed transmission operation. However, the TDM-PON system complicates an upstream transmission process, encounters a TDM delay in packet transmission, and allows two hierarchical packets to be processed by the ONT for every subscriber to be higher than a link speed between the OLT and the ONT, such that it may increase processing capacity instead of a packet reception rate.

The active network has advantages in that it enables individual ONTs of users to be independent of each other and performs upstream/downstream transmission services using the same method, however, it has disadvantages in that it is worse than the TDM-PON system in a variety of areas, for example, installation, extensibility, and economic efficiency of optical cables and must perform photoelectric conversion and electric-to-optical conversion operations in a subscriber distribution/access field.

In order to solve the aforementioned problems, as shown in FIG. 1, a WDM(Wavelength Division Multiplexing)/SCM(Sub-Carrier Multiplexing)-PON system for constructing a communication link requested between an OLT 14 and a plurality of ONTs 11 in the form of a multi-link in association with the WDM/SCM scheme is increasingly developed.

The WDM/SCM-PON system shown in FIG. 1 adapts an AWG (Arrayed Wavelength Grating) acting as a passive element and an optical splitter/combiner 12 to physically interconnect the ONTs. A multi-link between the ONTs 11 and the OLT 14 is composed of a plurality of wavelengths and a plurality of sub-carriers as shown in FIG. 2.

Referring to FIG. 2, a first ONT (ONT1) is assigned to a first channel of a wavelength #1 (i.e., Sub-carrier #1), a second ONT (ONT2) is assigned to a second channel of the wavelength #1 (i.e., Sub-carrier #2), and an N-th ONT(ONT N) is assigned to first and second channels of the other wavelength #2 (i.e., Sub-carriers #1 and #2). In this case, a subscriber's frame can be classified by MAC address information. In more detail, if a specific ONT assigned to a corresponding MAC address uses a single SCM channel, it can distinguish a wavelength and an SCM channel from each other, such that the OLT 14 can determine an output link and transmit a frame over the determined output link. Although the ONT assigned to the corresponding MAC address uses a multiplexing SCM channel, the OLT 14 classifies the multiplexing SCM channel using a single link and internally processes the classified multiplexing SCM channel, resulting in a switching to the output link.

The WDM/SCM scheme guarantees an independent connection configuration between the OLT 14 and the ONT 11 using a wavelength and a sub-carrier in a physical layer, and simplifies a control protocol for allocating/guaranteeing bandwidths, differently from the TDM scheme, resulting in increased applicability to a true commercial-use network.

However, the WDM/SCM PON system includes a plurality of SCM channels in the range of a single wavelength, and connects the ONT to the OLT in the form of a point-to-point access over the SCM channels. The WDM/SCM PON system requires a method for maintaining a prescribed frame sequence in transmission/reception modes, classifies traffic data to be transmitted over a link in the IEEE 802.3 link aggregation standard into a few conversation units, and guarantees the prescribed frame sequence in the conversation units. Therefore, provided that there are a small number of classifiable conversation units or an unbalanced bandwidth among the conversation units is formed, the WDM/SCM PON system cannot effectively use a desired link.

In order to solve the aforementioned problems, there has been newly proposed a variety of methods for maintaining a frame transmission sequence, for example, a padding method, a division method, and a tagging method. The padding method for transmitting a frame received from an upper layer using 1518 octets indicative of a maximum Ethernet transmission length is far from efficiency in traffic data of a short frame length, and must control a receiver to extract a padding part. The division method capable of forming a constant frame length divides a frame length into several units instead of padding the frame length, and transmits the divided frame units each having the same length. The division method adds a header having new division information to the divided frame units, transmits the divided frame units each having the header, and controls a reception end to reconstruct reception data according to header information, resulting in a complicated transmission/ reception process. Furthermore, the division method cannot maintain compatibility of a lower layer (i.e., a WDM/SCM-PHY), such that it requires a new physical layer. The tagging method for assigning a transmission sequence to the frame records such a transmission sequence to a header, adds the header to the frame, and transmits the frame with the header. However, the tagging method must reconstruct data on the basis of header information of the received frame, and must correct a standard protocol, resulting in a complicated implementation.

In conclusion, the above-described conventional methods cannot effectively use resources of the WDM/SCM-PON system.

SUMMARY OF THE INVENTION

Therefore, the present invention has been made in view of the above problems, and it is an object of the present invention to provide a termination device for use in a WDM-SCM PON system, which can effectively support a multi-channel integration function of a WDM/SCM PON system.

In accordance with the present invention, the above and other objects can be accomplished by the provision of a termination device contained in a termination end of a WDM/SCM (Wavelength Division Multiplexing/Sub-Carrier Multiplexing) PON (Passive Optical Network) to connect the PON with either a subscriber or an Ethernet service network, comprising: an Ethernet interface module connected to the Ethernet service network or the subscriber to perform an Ethernet interface function; a WDM/SCM physical layer module physically connected to the WDM/SCM PON to transmit/receive optical signals to/from the WDM/ SCM PON; and a MAC (Media Access Control)-bridge module for performing a multiplexing/demultiplexing operation based on a MAC address upon receipt of transmission/reception frames, and reconstructing preambles of the frames while being classified according to channels so that individual Ethernet frames are matching-processed while being classified according to SCM channels of the WDM/SCM physical layer module.

Preferably, the MAC-bridge module for use in the termination device of the WDM/SCM PON includes a transmitter and a receiver. The transmitter includes a multiplexer for multiplexing Ethernet frames received from the Ethernet interface module according to destination MAC addresses; a distributor for distributing the Ethernet frames received from the multiplexer to SCM channels; a plurality of channel input buffers assigned to individual SCM channels to sequentially store the Ethernet frames received from the distributor; and a preamble detachment function for attaching a preamble to individual Ethernet frames for every SCM channel stored in the plurality of channel input buffers, and sequentially transmitting the Ethernet frames each having the preamble to the WDM/SCM physical layer module. The receiver includes a preamble detachment function for removing a preamble from reception data frames for every SCM channel received from the WDM/SCM physical layer module to output only pure Ethernet frames; a plurality of channel output buffers for storing the Ethernet frames received from the preamble detachment function according to individual SCM channels; a collector for collecting the Ethernet frames stored in the plurality of channel output buffers while being classified according to subscribers on the basis of the MAC address, and creating a serial format; and a demultiplexer for demultiplexing the Ethernet frames for every subscriber received from the collector, and outputting the demultiplexed Ethernet frames to the Ethernet interface module.

Preferably, if a delay time between frames communicating with the WDM/SCM physical layer modules of termination devices for use in the WDM/SCM PON is a fixed delay time, the MAC-bridge module receives Ethernet frames transferred from the distributor to the multiplexer, distributes the Ethernet frames to be transmitted to a channel input buffer having the shortest wait Queue length, and transmits the distributed Ethernet frames. The receiver further includes a sequence guarantee function unit for activating token signals assigned for every channel in an arrival time sequence of SFDs (Start Frame Delimiters), and inserting the activated token signals into a token FIFO (First In First Out) block, controls the collector to select a plurality of channel output buffers according to a channel sequence corresponding to token information inside of the token FIFO block, and selects the plurality of channel output buffers, and transmits the demultiplexer, resulting in a guarantee of the sequence of reception Ethernet frames.

Preferably, if a delay time between frames communicating with WDM/SCM physical modules of the plurality of termination devices is a variable delay time, the transmitter of the MAC-bridge module calculates a delay time required for the frames to arrive at a WDM/SCM physical layer module of a destination termination device for every Ethernet frame, corrects an SFD (Start Frame Delimiter) transmission time of a corresponding frame to generate a delay time difference of more than 0 between the current Ethernet frame and the previous Ethernet frame, and guarantees a sequence of transmission frames, and transmits the corrected Ethernet frames, resulting in a guarantee of a transmission frame sequence.

Preferably, the transmitter of the MAC-bridge module further includes: a sequence guarantee input function unit for inserting an ACB (Adaptive Code Block) having a corresponding size into each Ethernet frame received from the multiplexer so as to allow a delay time between transmission paths dependent on a length difference between the Ethernet frame and a previous Ethernet frame to be higher than 0; and a sequence guarantee output function unit for reading frames from a plurality of channel input buffers, detecting the inserted ACB, and removing the detected ACB, such that it can prevent the ACB from being transmitted to the WDM/SCM physical module.

Preferably, the distributor includes: a demultiplexer for selectively applying Ethernet frames received from the sequence guarantee input function unit to the plurality of channel input buffers according to a scheduling sequence; and a scheduler for calculating a transmission delay time difference between the previous Ethernet frame and the current Ethernet frame on the basis of size information of the previous Ethernet frame and the current Ethernet frame, and calculating ACB's size information to allow the transmission delay time difference to be higher than a specific value of 0, wherein the sequence guarantee input function unit includes an ACB controller for generating an ACB of the calculated size information upon receiving a control signal from the scheduler, and a multiplexer for inserting the ACB generated by the ACB controller into the Ethernet frames received from the multiplexer to transmit the Ethernet frames each having the ACB to the distributor.

Preferably, the scheduler selects a channel input buffer having the smallest Queue size from among the channel input buffers on the condition that the current input frame is indicative of an i-th frame, compares the Queue size of the selected channel input buffer with that of another channel input buffer to which an i-th frame is transmitted in order to determine a Queue size difference $Q_{diff}$, compares the Queue size difference $Q_{diff}$ with a transmission delay time difference $$D_{diff}^{i,i-1}$$

dependent on individual sizes of the i-th Ethernet frame and the (i−1)-th Ethernet frame, determines an ACB size to be a specific value of 0 when the sum of the transmission delay time difference $$D_{diff}^{i,i-1}$$

and the Queue size difference $Q_{diff}$ is higher than the value of 0, and determines the ACB size to be an ACB size when the sum of the transmission delay time difference $$D_{diff}^{i,i-1}$$

and the Queue size difference $Q_{diff}$ is the same or less than the value of 0 in such a way that it transmits the determined ACB size and a number of a channel input buffer having the shortest Queue size to the sequence guarantee input function unit.

Preferably, the scheduler calculates the transmission delay time difference $$D_{diff}^{i,i-1}$$

between the previous Ethernet frame and the current Ethernet frame using the following equation:

$$D_{diff}^{i,i-1} = N \times (l_i - l_{i-1}) + (\delta_i - \delta_{i-1})_{min}$$

where N is the number of modules to be transmitted after storing all the frames, $l_i - l_{i-1}$ is a length difference between the previous Ethernet frame and the current Ethernet frame, and $(\delta_i - \delta_{i-1})_{min}$ is a minimum delay time difference generatable regardless of length information of the previous Ethernet frame and the current Ethernet frame.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
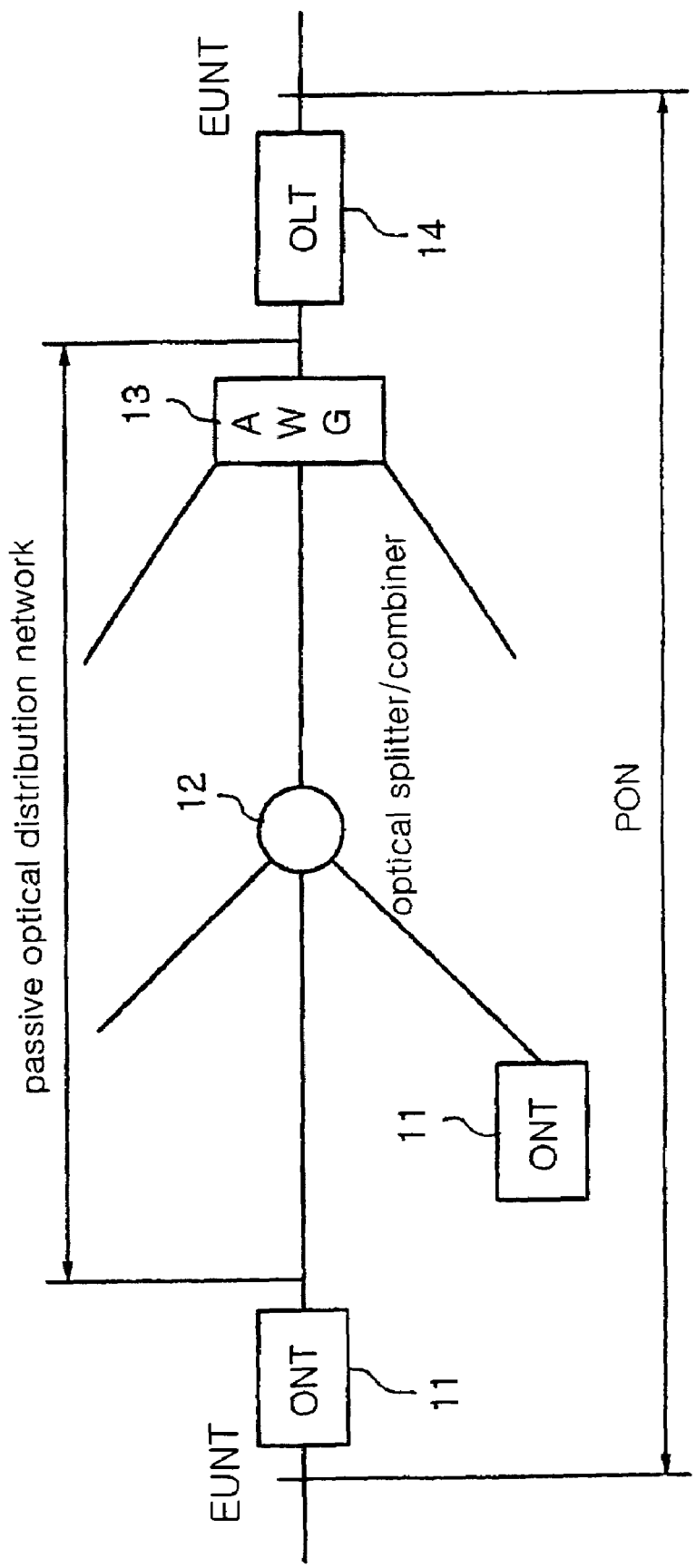
FIG. 1 is a block diagram illustrating a basic configuration of a WDM/SCM PON system.
Figure 2:
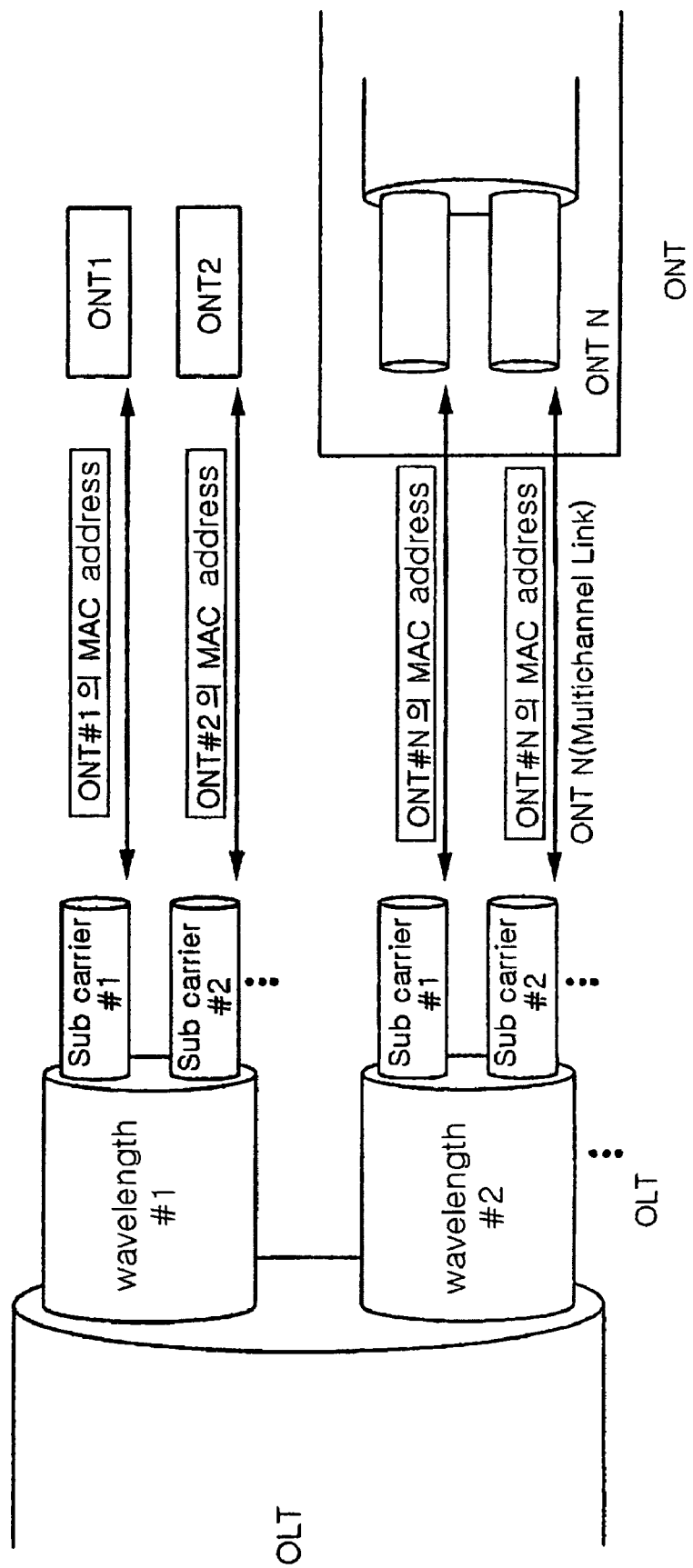
FIG. 2 is a view illustrating a link configuration of the WDM/SCM PON system.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

The termination device of the present invention can be commonly applicable to an OLT and a plurality of ONTs.

Figure 3:
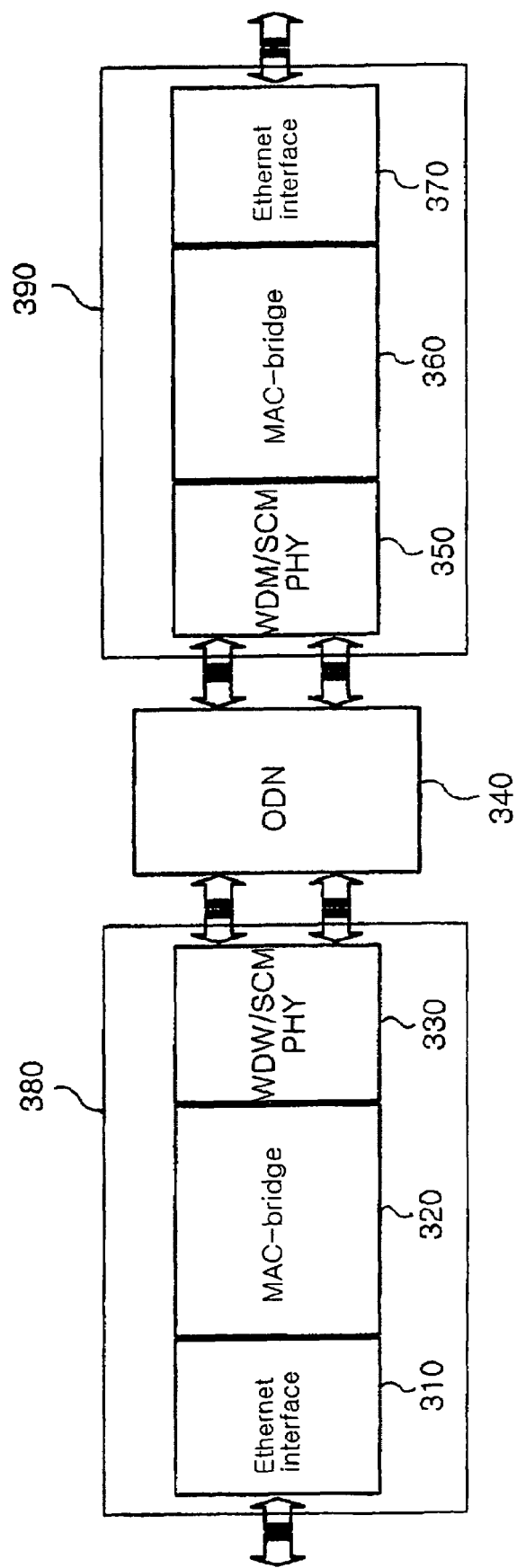
FIG. 3 is a block diagram illustrating an optical communication network termination device for use in the WDM/SCM PON system in accordance with a preferred embodiment of the present invention.

FIG. 3 is a block diagram illustrating an optical communication network termination device for use in the WDM/SCM PON system in accordance with a preferred embodiment of the present invention. Referring to FIG. 3, the PON system includes an OLT 380 for an ESNI (Ethernet Service Network Interface) connection, an ONT 390 for an EUNI (Ethernet User Network Interface) connection, and an ODN (Optical Domain Network) 340 for connecting the OLT 380 to the ONT 390.

The OLT 380 and the ONT 390 are configured in the form of a termination device of the present invention. The OLT 380 connected to either the ESNI or the EUNI includes an Ethernet interface module 310, a MAC-bridge module 320, and a WDM/SCM PHY (PHYsical layer) module 330. The ONT 390 connected to either the ESNI or the EUNI includes an Ethernet interface module 370, a MAC-bridge module 360, and a WDM/SCM PHY (PHYsical layer) module 350. The Ethernet interface modules 310 and 370 perform interface functions of an Ethernet physical layer and an Ethernet Pause Protocol. The MAC-bridge modules 320 and 360 add/remove a preamble to/from a transmission/reception Ethernet frame, perform multiplexing/demultiplexing operations based on a MAC address of the Ethernet frame so that individual Ethernet frames are matching-processed while being classified according to SCM. channels. The WDM/SCM PHY modules 330 and 350 connect the MAC-bridge modules 320 and 360 to the ODN 340, respectively, and transmit/receive optical signals according to SCM channels.

The MAC-bridge modules 320 and 360 and the WDM/SCM PHY modules 330 and 350 can use the GMII/MII/RMII available for the conventional Ethernet, and can maintain a conventional Ethernet frame without any change in a frame configuration. The WDM/SCM PHY modules 330 and 350 can utilize a PCS/PMA (Physical Medium Attachment/Physical Medium Dependent) function of the Ethernet.

The MAC-bridge modules 320 and 360 perform multiplexing/demultiplexing operations for every MAC address associated with a transmission/reception Ethernet frame, and perform a transmission/reception process for every SCM channel so that they can transmit the Ethernet frame over the SCM channels, resulting in a parallel link based on the SCM channel between the OLT 380 and the ONT 390.

Therefore, the multiplexing/demultiplexing operations must be removed from a connection path ranging from the WDM/SCM PHY module 330 of the OLT 380 to the WDM/SCM PHY module 350 of the ONT 390 over the ODN 340, because it is difficult to maintain a desired frame sequence when performing a multiplexing or demultiplexing operation in parallel link fields 330, 340, and 350.

Figure 4:
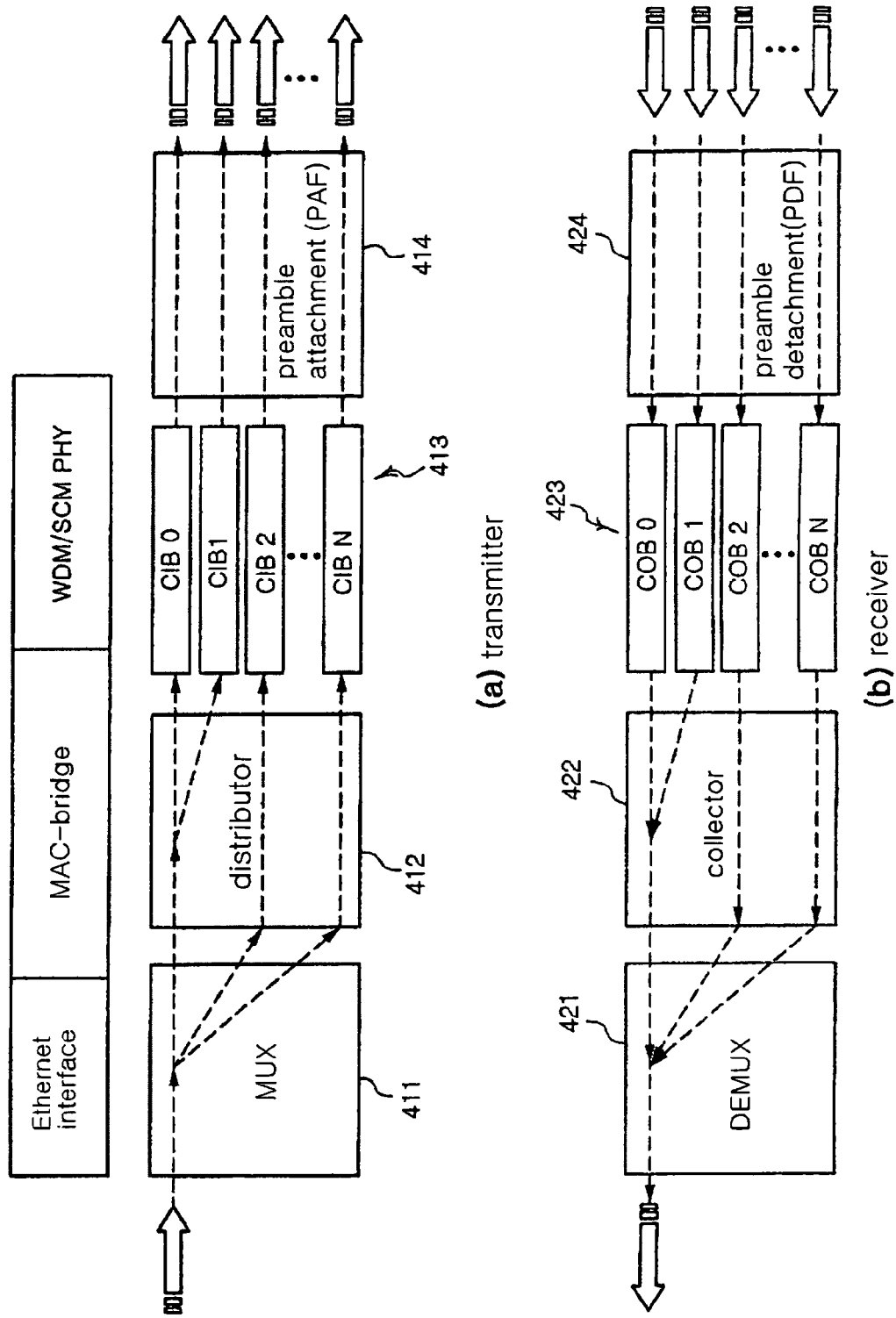
FIG. 4 is a view illustrating a detailed configuration of a MAC-bridge module contained in the termination device in accordance with a preferred embodiment of the present invention.

FIG. 4 is a view illustrating a detailed configuration of the MAC-bridge module 320 or 360 contained in the termination device in accordance with a preferred embodiment of the present invention. Referring to FIG. 4, the MAC-bridge module 320 or 360 includes a transmitter and a receiver. The transmitter includes a multiplexer 411 for analyzing a destination MAC address of a transmission Ethernet frame received from the Ethernet interface modules 310 and 370 to perform a multiplexing operation on the analyzed result according to MAC addresses; a distributor 412 for distributing the Ethernet frame received from the multiplexer 411 to SCM channels; a plurality of channel input buffers 413 connected to individual SCM channels of a PON system to store the Ethernet frames split from the distributor 412, respectively; and a preamble attachment function 414 for attaching a preamble to individual Ethernet frames contained in the channel input buffers 413, and transmitting the Ethernet frames with the preamble. The receiver includes a preamble detachment function 424 for removing a preamble from reception data frames for every SCM channel received from the WDM/SCM PHY modules 330 and 350 to extract only pure Ethernet frames; a plurality of channel output buffers 423 connected to individual SCM channels to store the Ethernet frames received from the preamble detachment function 424 according to channels; a collector 422 for collecting the Ethernet frames stored in the channel output buffers 423 while being classified according to subscribers on the basis of the MAC address, and creating a serial format; and a demultiplexer 421 for demultiplexing Ethernet frames for every subscriber received from the collector 422, and outputting the demultiplexed Ethernet frames to the Ethernet interface modules 310 and 370.

The transmission Ethernet frame applied to the MAC-bridge modules 320 and 360 has a pure Ether frame format composed of a destination address and CRC (Cyclic Redundancy Check) information.

In the case of the transmitter shown in FIG. 4a, the multiplexer 411 analyzes a destination MAC address upon receipt of the transmission Ethernet frame, multiplexes the analyzed result according to ONTs corresponding to individual MAC addresses, and outputs the multiplexed result. If a plurality of SCM channels are assigned to a single ONT, the distributor 412 distributes the Ethernet frames of a corresponding MAC address to individual SCM channels. The Ethernet frames of individual SCM channels distributed by the distributor 412 are stored in a plurality of channel input buffers 413, respectively. The plurality of channel input buffers 413 act as a temporary storage memory for interfacing link speeds of the WDM/SCM PHY modules 330 and 350 with operation speeds of the MAC-bridge modules 320 and 360 for every lower channel, so that they are assigned while being classified according to individual SCM channels and are operated using a FIFO (First In First Out) scheme. The preamble attachment function 414 successively attaches preambles to the Ethernet frames contained in individual channel input buffers 413, and transmits the Ethernet frames with the preambles to the WDM/SCM PHY modules 330 and 350.

The receiver shown in FIG. 4b is operated in the same way as the transmitter shown in FIG. 4a. The Ethernet frames received from the WDM/SCM PHY modules 330 and 350 are stored in the channel output buffer 423 assigned for every SCM channel in the form of a pure Ethernet frame from which a preamble is removed by the preamble detachment function 424. The Ethernet frames stored in the channel output buffer 423 are configured in the form of a serial format while being classified according to subscribers (ONTS) by the collector 423. The serial-format Ethernet frames for every ONT received from the collector 423 is demultiplexed by the demultiplexer 421, so that the demultiplexed result is transmitted to the Ethernet interface modules 310 and 370.

The preamble contained in data communicated between the termination device of the present invention and the PON is positioned to the front of a destination address of each Ethernet frame to establish bit synchronization of the transmitter/receiver ends. A start frame delimiter (SFD) contained in the preamble acts as frame synchronization bit stream indicative of the start of an available frame.

As shown in FIG. 3, frames transmitted between the OLT 380 and the ONT 390 are transmitted over a multi-link, such that it is difficult to guarantee a transmission sequence between frames. In this case, the alternation of the frame transmission sequence is caused by a frame transmission time difference per multi-path. The transmission delay time from a start time at which frame's SFDs are applied to the WDM/SCM PHY modules 330 and 350 to an end time at which the frame's SFDs are applied to remote WDM/SCM PHY modules 350 and 330 can be classified into a first delay time fixedly applied to all the frames and a second delay time varying with frames.

The termination device of the present invention can guarantee the sequence of transmission/reception frames according to two cases, i.e., the first case where an SFD arrival delay time of a WDM/SCM-PON's frame is a fixed delay time regardless of a frame length, and the second case where the SFD arrival delay time of the WDM/SCM-PON's frame is a variable delay time dependent on the frame length.

If there is only the fixed delay time in the WDM/SCM-PON, sequence determination information of frames applied to the WDM/SCM-PON, i.e., an arrival sequence of the SFDs, can be guaranteed. In this case, in the termination device of the present invention in each transmitter of the MAC-bridge modules 320 and 360, the distributor 412 does not fixedly distribute reception frames to the channel input buffer 413, compares the lengths of wait queues of individual channel input buffers 413 with each other, selects a buffer having the shortest wait queue from among a plurality of buffers upon receipt of the result of the comparison, and distributes the frames to the selected buffer. This distribution method is called a dynamic distribution method. The dynamic distribution method guarantees the arrival sequence of SFDs simultaneously with equally distributing loads to SCM channels, so that it can guarantee the sequence of frames in the receiver. A detailed configuration of the receiver and its operations will be described later.

On the other hand, if the delay time is not set to fixed values according to channels, the termination device of the present invention uses an additional adaptive code block to maintain the transmission/reception sequence between frames, and its detailed description will hereinafter be described. Typically, the variable delay time for every frame is classified into a delay time $P_N(l)$ dependent on a frame length and a randomly-generated delay time $\delta$ independent of the frame length. The total delay time generated by the delay time dependent on the frame length can be represented by the following Equation 1:

$$P^i_{total} = \sum_{k=1}^{N} P^i_k(l) \quad \text{[Equation 1]}$$

where $P^i$ is an i-th frame, a subscript k is a processing sequence, l is a length of a corresponding frame, and $P^i_k(l)$ is a time required for processing a specific frame having the length of l in the k-th process.

A total delay time generated on a transmission path of the i-th frame can be represented by the following Equation 2:

$$D^{i,i-1}_{diff} > 0 D^i_{total} = P^i_{total} + \delta_i \quad \text{[Equation 2]}$$

If the i-th frame and the i-th frame are applied to the WDM/SCM PHY module 330 at the same time, a difference in time during which the i-th frame and the i-th frame arrive at the channel output buffer 423 of the WDM/SCM PHY module 250 over the WDM/SCM PHY module 330 and the ODN 340 can be represented by the following Equation 3:

$$D^{i,i-1}_{diff} = (P^i_{total} + P^{i-1}_{total}) \quad \text{[Equation 3]}$$

A time difference of the k-th process present on a path is dependent on a length difference between two frames, such that the above Equation 3 can be represented by the following Equation 4:

$$D^{i,i-1}_{diff} = N \times (l_i - l_{i-1}) + (\delta_i - \delta_{i-1})_{min} \quad \text{[Equation 4]}$$

In conclusion, if the number of bits (i.e., time) between SFDs of two frames i and i−1 is corrected to maintain a prescribed condition $$D^{i,i-1}_{diff} > 0$$

with respect to a delay time difference between an (i−1)-th frame and an i-th frame of the channel input buffer 413 of individual termination devices, the sequence of frames can be guaranteed on a transmission path.

In order to correct the number of bits between SFDs of a current frame and a previous frame, the present invention inserts or extracts an ACB (Adaptive Code Block) having a variable length.

Figure 5:
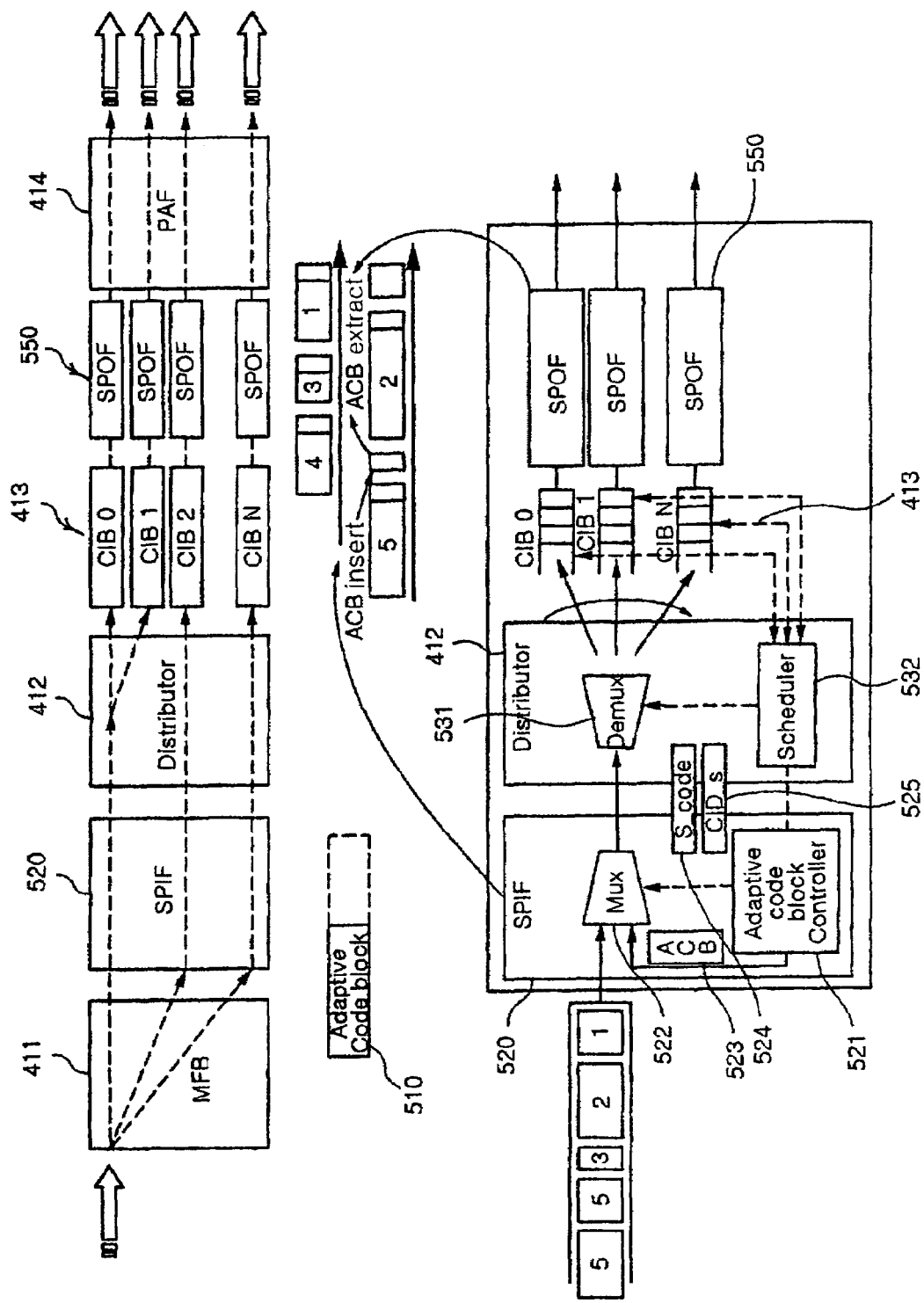
FIG. 5 is a detailed block diagram illustrating a transmitter of the MAC-bridge module contained in the termination device in accordance with another preferred embodiment of the present invention.
Figure 8:
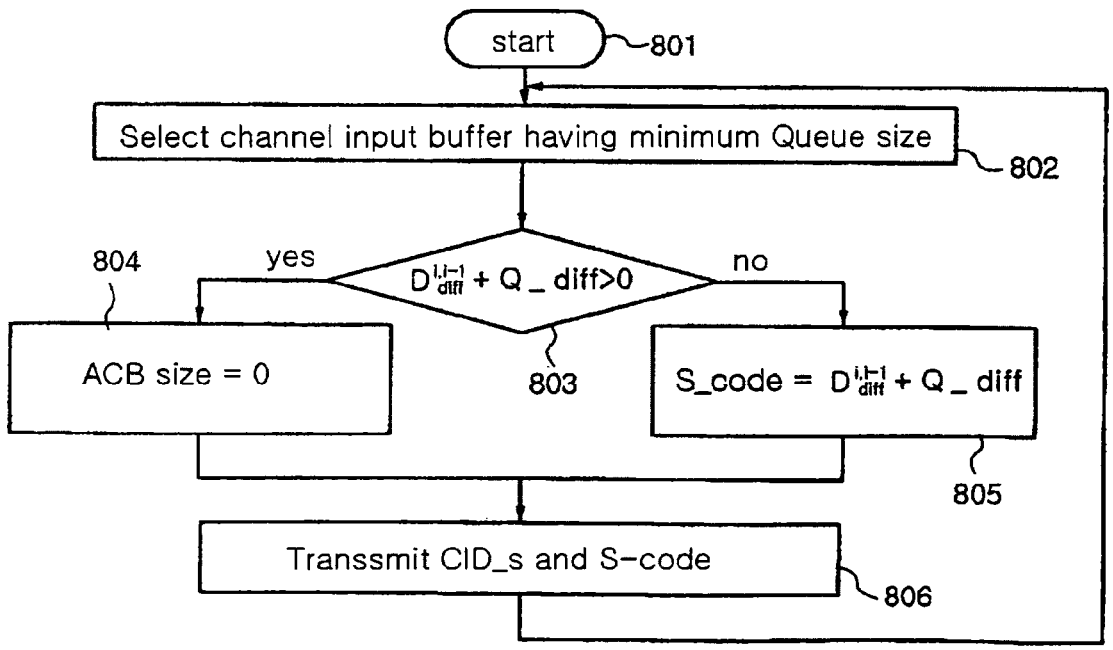
FIG. 8 is a flow chart illustrating a scheduling procedure of the transmitter of FIG. 5 in the termination device in accordance with the present invention.

FIG. 5 is a detailed block diagram illustrating a transmitter of the MAC-bridge module 320 or 360 in the case of using the ACB having such a variable length in accordance with another preferred embodiment of the present invention. FIG. 8 is a flow chart illustrating a scheduling procedure for determining a length of the ACB and a transmission channel (i.e., the channel output buffer 413 to be distributed) in accordance with the present invention.

Referring to FIG. 5, the transmitter of the MAC-bridge module 320 or 360 further includes a sequence guarantee input function unit 520 and a sequence guarantee output function unit 550 in addition to the components shown in FIG. 4a. The sequence guarantee input function unit 520 adds the ACB to the front of a corresponding Ethernet frame $P_i$ so as to generate a transmission time difference of more than 0 between Ethernet frames $P_i$ for every address received from the multiplexer 411 and their previous Ethernet frames $P_{i+1}$. The sequence guarantee output function unit 550 removes the ACB from the Ethernet frames received from the channel input buffer 413, and transmits the Ethernet frames having no ACB to the preamble attachment function 414. The current Ethernet frame $P_i$ is positioned at the rear of the previous Ethernet frame $P_{i+1}$ to increase a delay time dependent on the frame length, resulting in a guarantee of a frame transmission sequence. The sequence guarantee input function module 520 includes an ACB controller 521 for generating ACBs each having a pre-calculated size and a multiplexer 522 for attaching the ACBs to the front of a corresponding Ethernet frame. In this case, the sequence guarantee input function unit 520 distributes Ethernet frames received from the demultiplexer 531 of the distributor 412 to the channel input buffer 413 assigned to a corresponding SCM channel according to a scheduling process of the scheduler 532. In this case, the operations of the scheduler 532 are the same as in FIG. 8.

Referring to FIG. 8, operations of the transmitter of FIG. 5 will hereinafter be described.

The scheduler 532 selects a buffer having the smallest Queue size as a channel input buffer 413 to which an i-th Ethernet frame will be distributed at step 802.

The transmitter compares a first Queue size of the channel input buffer 413 to which the selected i-th Ethernet frame will be transmitted, a second Queue size of the channel input buffer 413 to which an i-th Ethernet frame is transmitted, and a third Queue size of the channel input buffer 413 to which the i-th Ethernet frame is distributed, such that it calculates a difference in Queue size (Q_diff). The transmitter calculates a delay time difference generated on a transmission path on the basis of a size of the (i−1)-th frame, and determines whether the delay time difference $$D_{diff}^{i,i-1}$$

is higher than the other delay time difference $$D_{diff}^{i,i-1} + Q\_diff$$

at step 803. The delay time difference $$D_{diff}^{i,i-1}$$

can be calculated by the above Equation 4. In this case, it is preferable for a difference $\delta_i - \delta_{i-1}$ in delay time independent of lengths of the i-th frame and the (i−1)-th frame to be determined to be a minimum value in order to consider the worst condition generatable on a transmission path. The length information of the i-th frame is extracted from the sequence guarantee input function unit 520, and is then transmitted to the scheduler 532.

Figure 7:
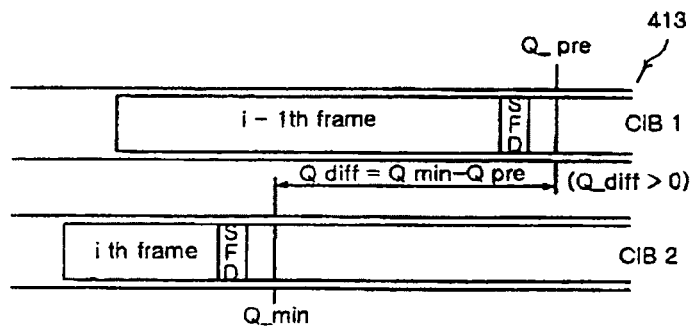
FIG. 7 is a view illustrating individual parameters for use in a scheduling process of a channel input buffer of the termination device in accordance with a preferred embodiment of the present invention.

Referring to the difference (Q_diff) in Queue size shown in FIG. 7, the (i−1)-th frame is distributed to a first channel input buffer CIB1. If a buffer having the smallest Queue size from among all the channel input buffers is equal to a second channel input buffer CIB2, the resultant value calculated by subtracting a Queue position (Q_min) of the second channel input buffer CIB2 from a Queue position (Q_pre) before receiving the (i−1)-th frame of the first channel input buffer CIB1 is equal to the difference (Q_diff) in Queue size.

If the sum of the delay time difference $$D_{diff}^{i,i-1}$$

and the Queue size difference Q_diff is higher than a specific value of 0 when determining the size of the ACB according to the result of the comparison, there is no need to attach the ACB, so that the size of the ACB is determined to be 0 at step 804. Otherwise, if the sum of the delay time difference $$D_{diff}^{i,i-1}$$

and the Queue size difference Q_diff is less than a specific value of 0, the i-th frame can arrive at a reception end at a faster time than the (i−1)-th frame, so that the sum of the delay time difference $$D_{diff}^{i,i-1}$$

and the Queue size difference Q_diff is determined to be a predetermined size (S_code) of the ACB at step 805. Thereafter, the determined channel input buffer 413 and the determined ACB's size (S_code, CID_s) are applied to the ACB controller 521 of the sequence guarantee input function unit 520 at step 806.

The ACB controller 521 of the sequence guarantee input function unit 520 controls the multiplexer 522 according to the ACB's size (S_code), transmits the ACB generated prior to a transmission time of the i-th frame to the distributor 412, and then transmits the i-th frame. The demultiplexer 531 of the distributor 412 transmits the ACB and the i-th Ethernet frame to a corresponding channel input buffer 413 according to a channel input buffer number (CID_s) determined by the scheduler 532. In more detail, the ACB and the i-th Ethernet frame are transmitted to the sequence guarantee output function unit 550 at consecutive bit rates. The sequence guarantee output function unit 550 detects the ACB from a received bit stream and removes the detected ACB, such that it can prevent the ACB from being transmitted to the lower layer.

As a result, the transmission sequence between frames in the transmitter of the MAC-bridge module can be guaranteed and at the same time the Ethernet frame can be maintained without any change, resulting in the maintenance of compatibility with the Ethernet physical layer.

Figure 6:
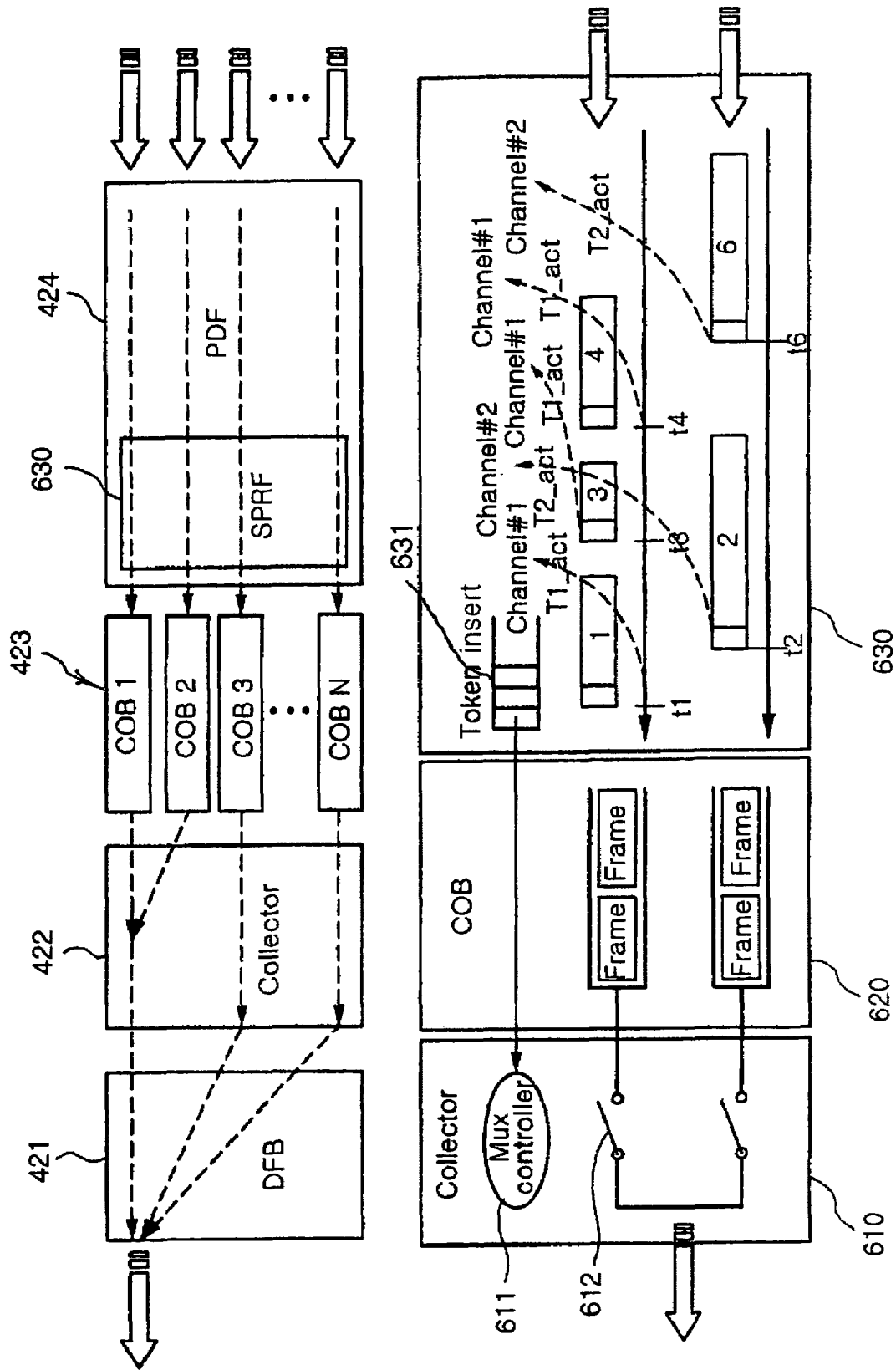
FIG. 6 is a detailed block diagram illustrating a receiver of the MAC-bridge module contained in the termination device in accordance with another preferred embodiment of the present invention.

FIG. 6 is a detailed block diagram illustrating another example of a receiver of the MAC-bridge module 412 when there is a fixed delay time in the WDM/SCM-PON system in accordance with another preferred embodiment of the present invention. The receiver further includes a sequence guarantee function unit 630 in addition to the preamble remover 424. The sequence guarantee function unit 630 activates token signals having been assigned to individual channels according to arrival times of the SFDs of the Ethernet frames received from the WDM/SCM PHY modules 330 and 350, and inserts the activated token signals into the token FIFO block. The channel collector 422 selects a plurality of channel output buffers according to a channel sequence corresponding to the token information contained in the token FIFO block, and transmits the selected channel output buffers to the demultiplexer, so that a transmission sequence of reception Ethernet frames can be identical with that of transmission Ethernet frames.

The preamble remover 424 includes a sequence guarantee function module 630, such that the sequence guarantee function module 630 removes a preamble from the Ethernet frame received from the lower layer (i.e., WDM/SCM PHY modules 330 and 350), activates token signals (T1_act and T2_act) having been assigned for every channel according to an arrival sequence of SFDs, and inserts the activated token signals to the token FIFO block 631. A multiplexer (MUX) controller 611 of the collector 422 controls a multiplexer 612 according to token information (T1_act and T2_act) contained in the token FIFO block 631. The reception Ethernet frames having been sequentially stored in the channel output buffer 420 according to their arrival sequences can be transmitted to the upper layer (i.e., Ethernet interfaces 310 and 370) simultaneously maintaining their transmission sequences.

The above-described termination device of the present invention can be applicable to all the WDM/SCM physical environments each having a processing time dependent on the frame length.

As apparent from the above description, the termination device of the present invention can be adapted to the ONT and the OLT, resulting in the following advantages.

Firstly, the termination device can configure a point-to-point link over a multi-SCM channel, and can guarantee a frame transmission sequence during a frame transmission time.

Secondly, the termination device can minimize the number of unnecessary overheads required for maintaining a frame transmission sequence, resulting in effective multi-channel use.

Thirdly, the termination device can equally distribute loads to channels using a dynamic distribution algorithm, resulting in a minimum transmission delay and maximum link use efficiency.

Fourthly, the termination device can limit a new frame configuration to only the MAC-bridge layer, resulting in the maintenance of compatibility with a conventional Ethernet physical layer.

Fifthly, the termination device can operate transmission sequence guarantee algorithms of transmission/reception nodes independently of each other, such that there is no need to establish synchronization (e.g., tagging) for guaranteeing a sequence between the reception node and the transmission node, resulting in an uncomplicated control process.

Sixthly, the termination device can guarantee a stable frame transmission sequence even though the WDM/SCM physical layer transmits frames using a Store-and-Forward scheme.

Seventhly, the termination device does not require any information associated with individual frames on a parallel channel because it transmits frames according to the sequence information stored in a buffer during a frame transmission time. Therefore, the termination device can greatly reduce control complexity as compared to a conventional frame transmission time control method, and can also be easily implemented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A termination apparatus contained in a termination end of a WDM/SCM (Wavelength Division Multiplexing/Sub-Carrier Multiplexing) PON (Passive Optical Network) to connect the WDM/SCM PON with either a subscriber or an Ethernet service network, comprising:

an Ethernet interface module connected to the Ethernet service network or the subscriber to perform an Ethernet interface function;

a WDM/SCM physical layer module physically connected to the WDM/SCM PON to transmit/receive optical signals to/from the WDM/SCM PON over a plurality of SCM channels; and a MAC (Media Access Control)-bridge module for performing a multiplexing/demultiplexing operation based on a MAC address upon receipt of frames communicated between the Ethernet service network and the WDM/SCM PON, correcting an SFD (Start Frame Delimiter) position of the frames to provide a delay time difference of more than 0 between adjacent frames, distributing Ethernet frames to individual SCM channels, and interfacing the distributed Ethernet frames with the WDM/SCM physical layer module.

2. The apparatus as set forth in claim 1, wherein the MAC-bridge module includes a transmitter and a receiver, the transmitter including:

a multiplexer for analyzing MAC addresses of transmission Ethernet frames received from the Ethernet interface module, and multiplexing the analyzed transmission Ethernet frames while being classified according to the MAC addresses;

a distributor for distributing the Ethernet frames for every MAC address received from the multiplexer to SCM channels;

a plurality of channel input buffers respectively connected to individual SCM channels, for receiving the Ethernet frames from the distributor, and sequentially outputting the received Ethernet frames; and a preamble detachment function for attaching a preamble to individual Ethernet frames for every SCM channel contained in the plurality of channel input buffers, and transmitting the Ethernet frames each having the preamble, and the receiver including:

a preamble detachment function for removing a preamble from reception data for every SCM channel received from the WDM/SCM physical layer module;

a plurality of channel output buffers for temporarily storing Ethernet frames received from the preamble detachment function;

a collector for collecting the Ethernet frames stored in the plurality of channel output buffers while being classified according to subscribers, and creating a serial format; and a demultiplexer for demultiplexing the Ethernet frames for every subscriber received from the collector, and outputting the demultiplexed Ethernet frames to the Ethernet interface module.

3. The apparatus as set forth in claim 2, wherein the distributor of the transmitter receives the Ethernet frames to be transmitted from the multiplexer, and distributes the received Ethernet frame to a channel input buffer having the shortest wait Queue length.

4. The apparatus as set forth in claim 3, wherein the transmitter, if a delay time between frames communicating with WDM/SCM physical modules of a plurality of termination apparatuses is a variable delay time, calculates a delay time required for the frames to arrive at a WDM/SCM physical layer module of a destination termination apparatus for every Ethernet frame, corrects an SFD (Start Frame Delimiter) position of a corresponding frame in a channel input buffer so as to provide a delay time difference of more than 0 between a current Ethernet frame and a previous Ethernet frame, and guarantees a sequence of transmission frames.

5. The apparatus as set forth in claim 4, wherein the transmitter further includes:

a sequence guarantee input function unit for inserting an ACB (Adaptive Code Block) into each Ethernet frame received from the multiplexer so as to allow a delay time between transmission paths dependent on a length difference between the Ethernet frame and a previous Ethernet frame to be higher than 0; and a sequence guarantee output function unit for reading frames from a plurality of channel input buffers, detecting the inserted ACB, and removing the detected ACB, such that it can prevent the ACB from being transmitted to the WDM/SCM physical module.

6. The apparatus as set forth in claim 5, wherein the distributor includes:
a demultiplexer for selectively applying Ethernet frames received from the sequence guarantee input function unit to the plurality of channel input buffers according to a scheduling sequence; and
a scheduler for calculating a transmission delay time difference between the previous Ethernet frame and the current Ethernet frame on the basis of size information of the previous Ethernet frame and the current Ethernet frame, and calculating ACB's size information to allow the transmission delay time difference to be higher than a specific value of 0,
wherein the sequence guarantee input function unit includes an ACB controller for generating an ACB of the calculated size information upon receiving a control signal from the scheduler, and a multiplexer for inserting the ACB generated by the ACB controller into the Ethernet frames received from the multiplexer to transmit the Ethernet frames each having the ACB to the distributor.

7. The apparatus as set forth in claim 6, wherein the scheduler selects a channel input buffer having the smallest Queue size from among the channel input buffers on the condition that the current input frame is indicative of an i-th frame, compares the Queue size of the selected channel input buffer with that of another channel input buffer to which an i-th frame is transmitted in order to determine a Queue size difference $Q_{diff}$ compares the Queue size difference $Q_{diff}$ with a transmission delay time difference $D_{diff}^{i,i-1}$ dependent on individual sizes of the i-th Ethernet frame and the (i-1)-th Ethernet frame, determines an ACB size to be a specific value of 0 when the sum of the transmission delay time difference $D_{diff}^{i,i-1}$ and the Queue size difference $Q_{diff}$ is higher than the value of 0, and determines the ACB size to be an ACB size when the sum of the transmission delay time difference $D_{diff}^{i,i-1}$ and the Queue size difference $Q_{diff}$ is the same or less than the value of 0 in such a way that it transmits the determined ACB size and a number of a channel input buffer having the shortest Queue size to the sequence guarantee input function unit.

8. The apparatus as set forth in claim 7, wherein the scheduler calculates the transmission delay time difference $D_{diff}^{i,i-1}$ between the previous Ethernet frame and the current Ethernet frame using the following equation:

$$D_{diff}^{i,i-1} = N \times (l_1 - l_{i-1}) + (\delta_i - \delta_{i-1})_{\min}$$

where N is the number of modules to be transmitted after storing all the frames, $l_1$-$l_{i-1}$ is a length difference between the previous Ethernet frame and the current Ethernet frame, and $(\delta_i \delta_{i-1})_{min}$ is a minimum delay time difference generatable regardless of length information of the previous Ethernet frame and the current Ethernet frame.

9. The apparatus as set forth in claim 3, wherein the receiver further includes a sequence guarantee function unit for activating token signals assigned for every channel in an arrival time sequence of SFDs (Start Frame Delimiters), and inserting the activated token signals into a token FIFO (First In First Out) block, controls the collector to select a plurality of channel output buffers according to a channel sequence corresponding to token information inside of the token FIFO block, and selects the plurality of channel output buffers, and transmits the demultiplexer, whereby
the sequence of reception Ethernet frames can be guaranteed.

* * * * *